US012361615B2

(12) United States Patent
Tendolkar et al.

(10) Patent No.: US 12,361,615 B2
(45) Date of Patent: Jul. 15, 2025

(54) CONTENT LAYOUT SYSTEMS AND PROCESSES

(71) Applicant: Microsoft Technology Licensing, LLC, Redmond, WA (US)

(72) Inventors: Gaurav Vinayak Tendolkar, Santa Clara, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 17/828,857

(22) Filed: May 31, 2022

(65) Prior Publication Data
US 2023/0386109 A1     Nov. 30, 2023

(51) Int. Cl.
*G06K 9/00* (2022.01)
*G06F 3/04845* (2022.01)
*G06T 11/60* (2006.01)
*G06V 10/44* (2022.01)
*G06V 10/75* (2022.01)

(52) U.S. Cl.
CPC .......... *G06T 11/60* (2013.01); *G06F 3/04845* (2013.01); *G06V 10/44* (2022.01); *G06V 10/751* (2022.01)

(58) Field of Classification Search
CPC .. G06F 3/04845; G06F 40/186; G06F 40/106; G06F 3/0484
See application file for complete search history.

(56) References Cited

U.S. PATENT DOCUMENTS

| | | | |
|---|---|---|---|
| 2004/0145593 A1* | 7/2004 | Berkner | G06F 16/9577 345/619 |
| 2014/0095551 A1* | 4/2014 | Grosz | G06F 3/04842 707/812 |
| 2014/0096041 A1* | 4/2014 | Gowen | G06Q 30/0621 715/753 |
| 2018/0150446 A1* | 5/2018 | Sivaji | G06F 16/958 |

(Continued)

OTHER PUBLICATIONS

Brückner, Lukas, Luis A. Leiva, and Antti Oulasvirta. "Learning GUI completions with user-defined constraints." ACM Transactions on Interactive Intelligent Systems (TiiS) 12.1 Feb. 2022 (Year: 2022).*

(Continued)

*Primary Examiner* — Gregory A Morse
*Assistant Examiner* — Owais Iqbal Memon
(74) *Attorney, Agent, or Firm* — NovoTechIP International PLLC

(57) ABSTRACT

A data processing system is implemented for receiving an image of a canvas, and detecting design features within the canvas by analyzing the image. The data processing system is implemented for determining an execution of a command by comparing the image to a current image of the canvas, and modifying the design features within the canvas to generate layouts in response to determining the execution of the command. Further, the data processing system is implemented for determining parameters of the modified design features, and determining a value for each layout by applying rules to the parameters of the modified design features. In addition, the data processing system is implemented for displaying the layouts based on the determined value for each layout to a user.

20 Claims, 13 Drawing Sheets

(56) References Cited

U.S. PATENT DOCUMENTS

2019/0325626 A1* 10/2019 Tao .................. G06T 11/60
2023/0237717 A1* 7/2023 Muscolino .............. G06T 11/40

OTHER PUBLICATIONS

Tabata, Sou, et al. "Automatic layout generation for graphical design magazines." ACM SIGGRAPH 2019 Posters. Jan. 2, 2019. (Year: 2019).*

Brückner, et al., "Learning GUI Completions with User-defined Constraints", In Journal of ACM Transactions on Interactive Intelligent Systems, vol. 12, Issue 1, Feb. 2022, 40 Pages.

Lee, et al., "Neural Design Network: Graphic Layout Generation with Constraints", In Proceedings of 16th European Conference on Computer Vision, Aug. 23, 2020, pp. 491-506.

Li, et al., "Attribute-conditioned Layout GAN for Automatic Graphic Design", In Journal of IEEE Transactions on Visualization and Computer Graphics, vol. 27, Issue 10, Oct. 2021, 10 Pages.

O'Donovan, et al., "DesignScape Design with Interactive Layout Suggestions", In Proceedings of the 33rd Annual ACM Conference on Human Factors in Computing Systems, Apr. 2015, pp. 1221-1224.

"International Search Report and Written Opinion Issued in PCT Application No. PCT/US23/018405", Mailed Date: Jun. 13, 2023, 15 Pages.

Tabata, et al., "Automatic layout generation for graphical design magazines", In ACM SIGGRAPH Posters, Jul. 28, 2019, 2 Pages.

Kikuchi, et al., "Constrained Graphic Layout Generation via Latent Optimization", In Repository of arXiv:2108.00871v1, Aug. 2, 2021, 9 Pages.

* cited by examiner

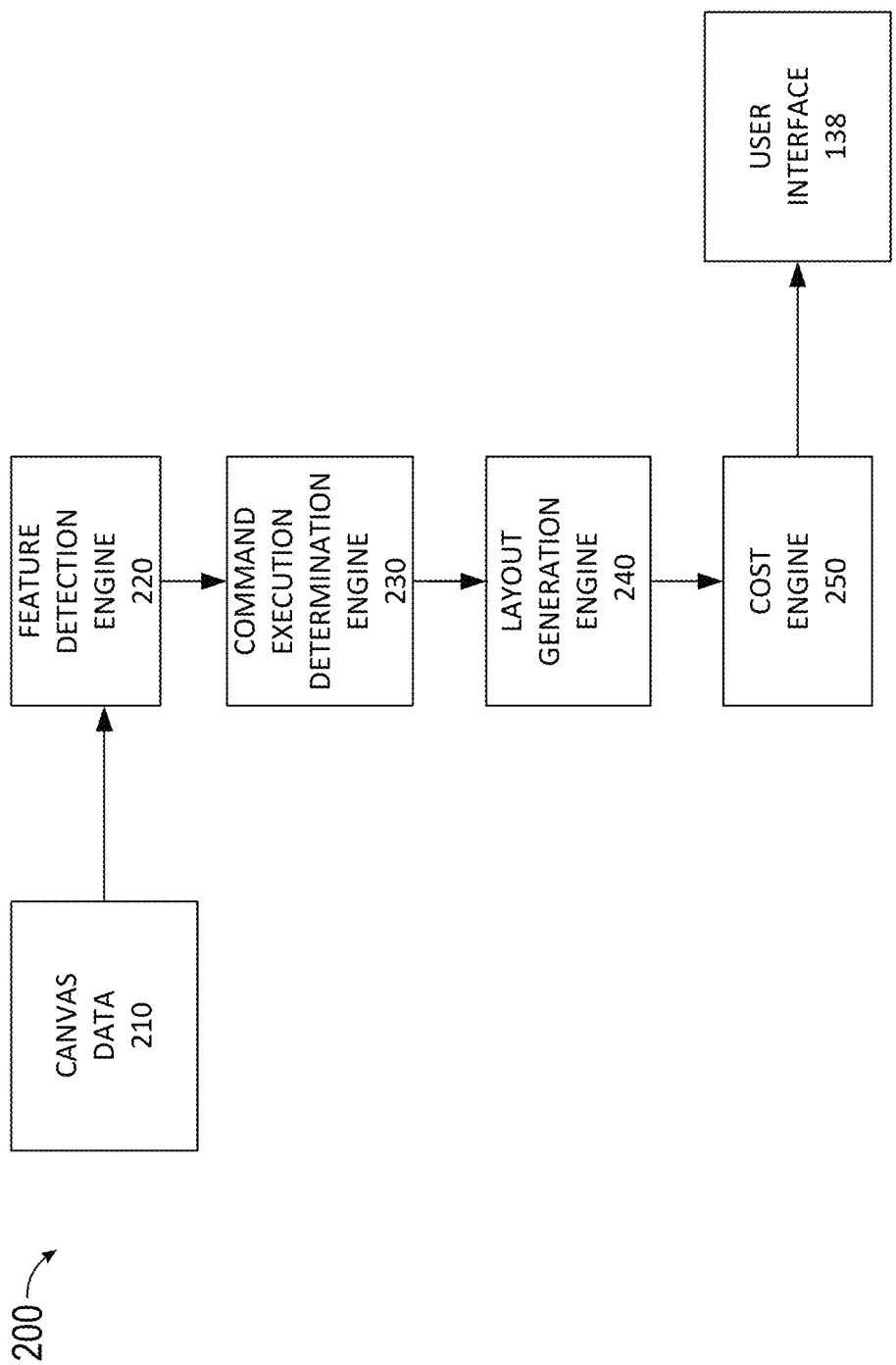

CONTENT LAYOUT SYSTEMS AND PROCESSES

BACKGROUND

Generally, performing an operation on an object in a layout may result in an undesirable change in the layout. As an example, changing a position of an object may misalign the object with other objects in the layout. As another example, increasing a size of an object may result in the object overlapping other objects in the layout.

Hence, there is a need for improved systems and processes for generating a layout of content.

SUMMARY

An example data processing system according to the disclosure may include a processor and a machine-readable medium storing executable instructions. The instructions when executed cause the processor to perform operations which include receiving an image of a canvas; detecting design features within the canvas by analyzing the image; determining an execution of a command by comparing the image to a current image of the canvas; modifying the design features within the canvas to generate layouts in response to determining the execution of the command; determining parameters of the modified design features; determining a value for each layout by applying rules to the parameters of the modified design features; and displaying the layouts based on the determined value for each layout to a user.

An example method implemented in a data processing system includes receiving an image of a canvas; detecting design features within the canvas by analyzing the image; determining an execution of a command by comparing the image to a current image of the canvas; modifying the design features within the canvas to generate layouts in response to determining the execution of the command; determining parameters of the modified design features; determining a value for each layout by applying rules to the parameters of the modified design features; and displaying the layouts based on the determined value for each layout to a user.

An example machine-readable medium on which are stored instructions. The instructions when executed cause a processor of a programmable device to perform operations of receiving an image of a canvas; detecting design features within the canvas by analyzing the image; determining an execution of a command by comparing the image to a current image of the canvas; modifying the design features within the canvas to generate layouts in response to determining the execution of the command; determining parameters of the modified design features; determining a value for each layout by applying rules to the parameters of the modified design features; and displaying the layouts based on the determined value for each layout to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 depicts a simplified architecture for operations of reorganizing content in a layout.

DETAILED DESCRIPTION

Figure 1:
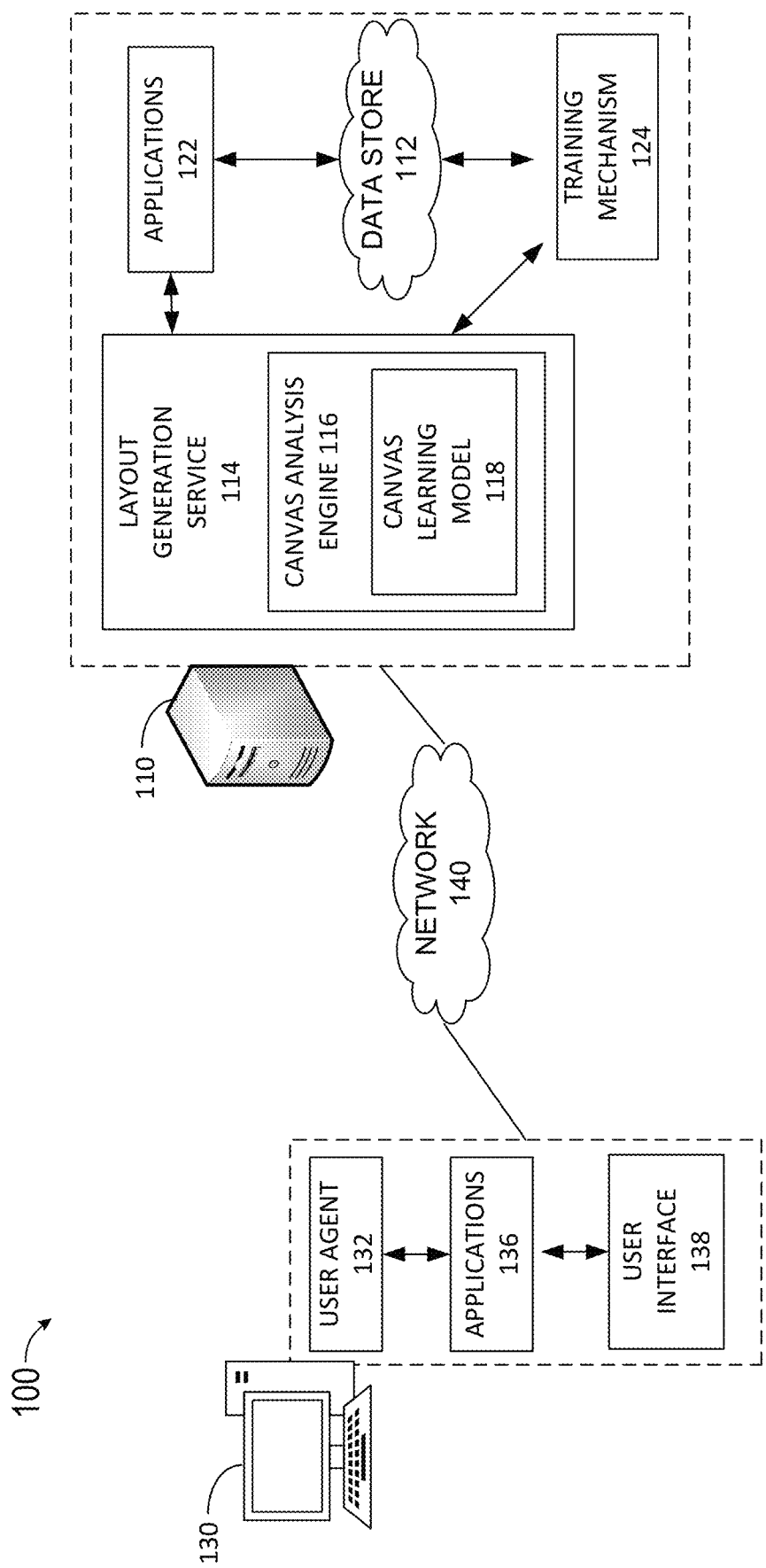
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, a user creates a layout of content which includes design features for a particular topic in a particular medium. Examples of a medium include a social media platform, an electronic commerce website, and/or an electronic message, amongst other examples of a medium. Examples of topics include real estate, clothing, and/or sports, amongst other topics. In embodiments, the layout may include a canvas containing a plurality of design features in relation to this topic. Examples of these design features may include images, text boxes, and videos, amongst other examples.

One technical problem which arises is visual clutter within the layout as a user performs commands. Specifically, as a user performs commands on design features within the canvas, other design features within the canvas may be affected. Examples of user commands include adding a design feature to the canvas, deleting a design feature from the canvas, changing a size of a design feature within the canvas, and changing an orientation of a design feature within the canvas, amongst other examples. In response to these user actions, visual clutter may arise in the layout, possibly rendering the layout undesirable to the user because of positioning of the design features within the canvas, amongst other issues. Accordingly, a user may be limited in creating the layout they desire because of visual clutter arising.

To address these technical problems and more, this description discloses technical solutions relating to artificial intelligence (AI) assisted content creation and layout. Specifically, the technical solutions provided herein generate and provide layout recommendations to a user for reducing visual clutter in a layout. In embodiments, aspects of the instant application leverage an optimization algorithm to optimize modifications of design features in a layout. As an example, a technical solution provided by the disclosure allows for changing a size of a design feature in a desirable way for different aspect ratios, such as for social media posts or stories, banner ads, and the like.

In embodiments, aspects of the disclosure include an optimization algorithm that utilizes a cost function which takes into account various rules to reduce visual clutter within a layout of content. Specifically, aspects of the present application normalize and weigh these various rules, depending on user preferences and/or user topics. Another aspect of the present application includes canonical user interface (UI) examples of design features which are generated in response to a user editing a canvas. In embodiments, editing the canvas triggers a display of a layout recommendation pane which displays various layouts recommendations that optimize a layout based on design features within the canvas, while preserving an original style of the layout. These technical solutions provided by the instant application allow for a user to be provided with optimal layout recommendations without having a user perform a plurality of steps manually.

As a general matter, the methods and systems described herein may include, or otherwise make use of, a machine-trained model to generate layouts of content. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to determine parameters of design features within a canvas. Such determination may be made following the execution of user commands and/or modifications of the design features, and may be configured to provide the ML algorithm (MLA) with an initial or ongoing set of training data. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate cost determination for modified design features and/or to increase the training data for future layout generation.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a stacked trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a server 110 which may be connected to or include a data store 112 which may function as a repository in which datasets relating to training models, data relating to a layout generation service 114 and/or data relating to applications 122 may be stored. Although shown as a single data store, the data store 112 may be representative of multiple storage devices and data stores which may be connected to each of the layout generation service 114, applications 122 or canvas learning model 118. Moreover, the server 110 may include a plurality of servers that work together to deliver the functions and services provided by each service or application. The server 110 may operate as a shared resource server located at an enterprise accessible by various computer client devices such as client device 130. The server 110 may also operate as a cloud-based server for offering change recognition services in one or more applications such as applications 122.

The server 110 may include and/or execute the layout generation service 114 which may access a design application running on the client device 130. Examples of the design application include any application which allows a user to place design features within a canvas. The layout generation service 114 may operate to access an initial layout a user is generating using the design application from a user's client device 130 via the design application (e.g., applications 122 or applications 136). In embodiments, the layout generation service 114 receives canvas data from the initial layout, examines the canvas data, and provides recommendations for layouts to a user through the user's client device 130 in response to the user executing commands within the design application.

In embodiments, the layout generation service 114 determines design features within the canvas of the initial layout by analyzing the canvas data received from the client device 130. Specifically, the canvas analysis engine 116 of the layout generation service 114 takes an image of the canvas of the initial layout the user is currently generating. In embodiments, the image of the canvas includes various design features, amongst other information. In this way, the canvas data includes an image of the canvas a user is utilizing, and the layout generation service 114 receives the image of the canvas by accessing a design application the user is utilizing on the client device 130.

In embodiments, the image of the canvas includes design features related to a user's topic. Examples of design features include images, text boxes, and videos, amongst other examples. As a specific example, if the user topic is real estate and the user is utilizing a medium such as a social media platform to display the real estate topic, the canvas may include design features such as images of a home for sale and/or text describing the home for sale.

In embodiments, the layout generation service 114 utilizes a canvas analysis engine 116 which analyzes the canvas to detect design features and determine parameters of the canvas and/or the design features. To detect the design features and determine the parameters, the canvas analysis engine 116 may make use of machine learning models, i.e., the canvas learning model 118, which operates to identify the design features within the canvas and any parameters and/or modifications to the design features within the canvas. In embodiments, the machine learning models used by the canvas learning model 118 include a deep learning model, such as a convolutional neural network (CNN).

In embodiments, the canvas learning model 118 applies different techniques on the image within the canvas data to detect the design features in the canvas. As an example, the canvas learning model 118 may apply image detection techniques, e.g., computer vision, to determine a design feature is an image. As another example, the canvas learning model 118 may also utilize natural language processing techniques to detect a design feature which is text. In this way, the canvas analysis engine 116 detects design features within the canvas by analyzing the image.

In response to determining the design features present in the canvas, the canvas learning model 118 determines parameters related to the canvas within the image of the canvas data. As an example, the canvas learning model 118 applies edge detection techniques to determine dimensions of the canvas as parameters of the canvas. As an example, the canvas learning model 118 determines a height and/or a width of the canvas using the edge detection techniques.

In embodiments, the canvas learning model 118 determines a point in the canvas as an origin using the edge detection techniques. Specifically, the origin serves as a reference point within the canvas for coordinates of a design feature. As an example, a design feature includes x and y coordinates with respect to the origin of the canvas. As a more specific example, an edge of a design feature has a value of 5 in the x coordinate and a value of 10 in the y coordinate with respect to the origin. In this example, the coordinates for the design feature are [5,10].

In embodiments, the canvas learning model 118 may determine the origin as a point which is in a location central to all the design features within the canvas. As another example, the canvas learning model 118 may determine the origin as a corner of the canvas, amongst other examples. In this example, the origin may have coordinates of [0,0], while a point across the canvas may have coordinates of [C, C].

In response to determining parameters related to the canvas, the canvas learning model 118 determines parameters related to the design features within the canvas. Specifically, the canvas learning model 118 applies edge detection techniques to extract bounding boxes around the design features. In embodiments, the bounding boxes allow for the canvas learning model 118 to determine parameters of each design feature within the canvas. Examples of the parameters determined by the canvas learning model 118 include a height and a width of the design feature, amongst other dimensions. In embodiments, the canvas learning model 118 measures a length of a side of a bounding box to determine a height or a width of a design feature. As a more specific example, the canvas learning model 118 measures the length of a side of a bounding box as being 5 millimeters (mm), thereby determining that a height of a design feature is 5 mm.

In embodiments, the canvas learning model 118 further utilizes the origin of the canvas and the bounding boxes to determine coordinates of each design feature as additional parameters. As an example, a corner of a bounding box may be 5 mm away from the origin of the canvas in an x-direction, and 10 mm away from the origin of the canvas in the y-direction. In this example, the design feature has (x, y) coordinates of [5,10] for this point of the bounding box.

In embodiments, the canvas analysis engine 116 utilizes the above information to determine a relationship between each design feature with respect to one another and/or with respect to the canvas. As an example, using the height and width of the canvas and the height and width of a design feature, the canvas analysis engine 116 determines a percentage amount of how much space of the canvas the design feature utilizes.

In embodiments, the canvas analysis engine 116 utilizes the dimensions of the design features, the coordinates of the design features, and/or the relationships between each design feature and/or relationships between each design feature and the canvas in determining potential modifications to the design features within the canvas. As an example, the canvas analysis engine 116 may utilize the relationship information to determine that a first design feature utilizes about 30% of the overall canvas, while a second design feature utilizes about 25% of the canvas. In this example, in generating potential layouts, the layout generation service 114 will modify the first design feature to utilize more space of the canvas than the second design feature because of the previous determined relationship.

In embodiments, as the canvas learning model 118 learns information related to both the canvas and the design features within the canvas, the canvas learning model 118 develops a knowledge base. Further, the canvas learning model 118 stores the knowledge base in the data store 112. Examples of information within the knowledge base include dimensions of the canvas, dimensions of each design feature within the canvas, the relationships between each design feature and the canvas, amongst other information.

After detecting the design features and/or determining information related to the design features and/or the canvas, the canvas analysis engine 116 may take a current image of the canvas. In embodiments, the canvas analysis engine 116 may take the current image after a specific period of time lapses. As an example, the canvas analysis engine 116 takes the current image of the canvas after a period of one minute lapses from accessing the initial layout on the client device 130.

In response to taking the current image, the canvas analysis engine 116 determines whether a user of the design application has executed a command with respect to the initial layout on at least one design feature of the design features. Examples of commands executed by a user include a user deleting a design feature from the canvas, a user adding a design feature to the canvas, a user changing a size of a design feature within the canvas, and/or a user changing an orientation of a design feature within the canvas, amongst other examples.

In embodiments, the canvas analysis engine 116 compares the image from the canvas data to the current image to determine commands executed by the user. Specifically, the canvas analysis engine 116 may utilize computer vision to detect design features within the current image. In response to detecting design features in the current image, the canvas analysis engine 116 compares the detected design features from the current image to the detected design features in the image from the canvas data. In this way, the canvas analysis engine 116 determines an execution of a command by comparing the image to a current image of the canvas.

As an example, the canvas analysis engine 116 determines that the user executed an addition command as the executed command in response to detecting an additional design feature within the canvas that was not present previously. As another example, the canvas analysis engine 116 determines that the user executed a deletion command as the executed command in response to detecting a design feature missing from the current image of the canvas. Examples of an executable command include deleting a design feature from the canvas, adding a design feature to the canvas, changing a size of a design feature within the canvas, and changing an orientation of a design feature within the canvas, amongst other examples.

In embodiments, the canvas analysis engine 116 of the layout generation service 114 modifies the design features within the canvas to generate layouts in response to determining the execution of the command. Specifically, the canvas analysis engine 116 generates the various layouts so that every modification available for each design feature is shown in at least one layout. To modify a design feature, the canvas analysis engine 116 may change an orientation of a design feature, a position of a design feature, increase a size of a design feature, and/or decrease a size of a design feature, amongst other examples of modifications.

As an example, the canvas analysis engine 116 generates a first layout depicting a first modified design feature being increased in height by 2 mm and increased in width by 3 mm, while a second modified design feature is increased in height by 1 mm in height and increased in width by 2 mm. As another example, the canvas analysis engine 116 generates a second layout depicting a first modified design feature being decreased in height by 2 mm and an increased in width by 3 mm, while a second modified design feature within the second layout is increased by 1 mm in height and decreased by 2 mm in width.

In embodiments, in response to modifying the design features, the canvas analysis engine 116 determines parameters of the modified design features within each generated layout. Similar to determining the parameters of the design features from the canvas data, the canvas analysis engine 116 determines parameters of the modified design features using machine learning models of the canvas learning model 118. Specifically, the canvas learning model 118 uses edge detection techniques to extract bounding boxes around the modified design features.

In response to extracting the bounding boxes, the canvas analysis engine 116 determines the parameters of the modified design features using the bounding boxes. As an example, the canvas analysis engine 116 determines that a modified design feature has a height of 7 mm in view of the bounding box around that modified design feature. As another example, the canvas analysis engine 116 determines that a first modified design feature has x, y coordinates of [10,10]. In this way, the canvas analysis engine 116 extracts bounding boxes around the modified design features, and uses the bounding boxes to determine the parameters of the modified design features.

Additionally, in view of determining an origin of the canvas, the canvas analysis engine 116 uses the bounding boxes and the origin of the canvas to determine the parameters of the modified design features. In this way, the parameters of the modified design features include coordinates for each modified design feature, a height for each modified design feature, and a width of each design feature.

In response to determining the parameters of the modified design features within each layout, the canvas analysis engine 116 determines a cost value for each layout by applying rules to the parameters of the design features which are not modified and/or by applying rules to the parameters of the modified design features. Specifically, the canvas analysis engine 116 determines a cost value for each layout by applying at least one cost rule out of a plurality of cost rules to the parameters of design features and/or the modified design features within that specific layout.

In embodiments, a first cost rule out of the plurality of cost rules is an overflow cost rule. Specifically, the overflow cost rule includes an addition of a penalty to that particular layout if a bounding box of a modified design feature overflows the canvas. In embodiments, the penalty for violating the overflow cost rule increases in value as an area of the modified design feature which overflows the canvas increases. If there is no overflow, the overflow cost rule is not violated and the cost is 0.

In embodiments, a second cost rule out of the plurality of cost rules is an overlap cost rule. Specifically, the overlap cost rule includes an addition of a penalty to that particular layout if a bounding box of a modified design feature overlaps any other bounding box of another modified design feature. In embodiments, the penalty for violating the overlap cost rule is an increasing function of an overlap area. Specifically, as a size of the overlap area increases, so does the penalty for violating the overlap cost rule. In embodiments, application of the overlap cost rule may be added if the two bounding boxes were not overlapping originally in the canvas prior to modification of the design features.

In embodiments, a third cost rule out of the plurality of cost rules is a resize cost rule. Specifically, the resize cost rule includes an addition of a penalty to that particular layout if a modified design feature has a size change which is too much of a change from a size prior to modification of that design feature. In embodiments, the penalty is an increasing function of a sum of height difference and width difference between a height and width of the modified design feature in comparison to a height and width of the design feature prior to modification. In this way, violation of the resize cost rule has a relatively lower cost compared to other costs for violating other rules.

In embodiments, a fourth cost rule out of the plurality of cost rules is an alignment cost rule. Specifically, the alignment cost rule includes every design feature needing to be aligned with at least one other design feature and/or a primary axis of the canvas within that particular layout. As an example, the alignment cost rule may require that similar design features have their bounding boxes aligned with respect to one another. As a more specific example, design features which are images may be aligned either vertically or horizontally with respect to one another. In this way, design features which are images should be aligned with respect to one another, while design features which are text boxes should be aligned with respect to one another. In embodiments, the primary axis may originate with respect to the origin of the canvas. In this way, the rules are with respect to the origin.

In embodiments, a fifth cost rule out of the plurality of cost rules is a symmetry cost rule. Specifically, the symmetry cost rule includes that every design feature which was symmetrical, either horizontally and/or vertically, prior to modification will incur a penalty if the modified design feature is non-symmetrical in the layout. In embodiments, the penalty for violating the symmetry cost rule increases in value as non-symmetry from the original symmetry of the design feature prior to modification increases.

In embodiments, a sixth cost rule out of the plurality of cost rules is an image aspect ratio cost rule. Specifically, the image aspect ratio cost rule includes adding a penalty to that particular layout for changing design features which are images beyond a desired aspect ratio range. In embodiments, the desired aspect ratio range may be set by the user of the client device 130. As an example, the desired aspect ratio range may be 4:5 and 1.91:1, amongst other examples. In embodiments, the penalty for violating the image aspect ratio cost rule increases in value as an aspect ratio of the modified design feature increases away from the desired aspect ratio range.

In embodiments, a seventh cost rule out of the plurality of cost rules is an unoccupied space cost rule. Specifically, the unoccupied space cost rule includes adding a penalty to that particular layout which corresponds to an amount of unoccupied space within the canvas by a design feature. In embodiments, the penalty for violating the unoccupied space rule increases in value as a size of the unoccupied space increases. As an example, if modifying the design features results in a layout where the unoccupied space of the canvas is about half the total canvas, the cost value for this layout will be higher than for a layout which has a smaller amount of unoccupied space.

In embodiments, an eighth cost rule out of the plurality of cost rules is a constraint violation cost rule. Specifically, the constraint violation cost rule includes a minimum height value and/or a minimum width value that a modified design feature should meet. In embodiments, if a bounding box of a modified design feature is below the minimum height value and/or a minimum width value, the penalty added to the layout for this violation is proportional to a difference between the minimum height value and/or a minimum width value and the current height and/or width value of the bounding box of the modified design feature. In this way, the rules include an overflow cost rule, an overlap cost rule, a resize cost rule, an alignment cost rule, a symmetry cost rule, an image aspect ratio cost rule, an unoccupied space cost rule, and a constraint violation cost rule.

In embodiments, each cost rule may be normalized and/or weighted in accordance with user preferences. For example, if a user desires most that the modified design features do not overlap each other, the user assigns a greater weight to the overlap cost rule than another rule, e.g., a resize cost rule. In embodiments, user preferences for the weightings of the cost rules are stored by the layout generation service 114 in the knowledge base as layout data. Further, the canvas analysis engine 116 of the layout generation service 114 may assign weights to the cost rules in view of the layout data, in addition to or instead of the user assigning weights to the cost rules. The layout data may also include dimensions of the canvas in each layout, dimensions of each modified design feature within each layout, and relationships between each modified design feature and the canvas within each layout, amongst other information.

In embodiments, a cost value for each layout is calculated in view of the rules. Further, the canvas analysis engine 116 of the layout generation service 114 displays the layouts to the user based on determined cost value. As an example, the canvas analysis engine 116 displays layouts having ascending costs, i.e., a first layout has a lowest cost out of all the generated layouts, while a second layout has a higher cost than the first layout, and a third layout has a higher cost than the first and second layouts. As another example, the canvas analysis engine 116 displays layouts having ascending costs, i.e., a first layout has a highest cost out of all the generated layouts, while a second layout has a lower cost than the first layout, and a third layout has a higher cost than the first and second layouts.

In embodiments, the canvas analysis engine 116 of the layout generation service 114 displays the layouts on the user interface 138 of the client device 130. Specifically, the canvas analysis engine 116 displays the layouts in a layout recommendation pane. For example, the canvas analysis engine 116 may display the layout recommendation pane adjacent to a canvas that the user is currently working on, amongst other locations on the user interface 138. In embodiments, the layout generation service 114 utilizes application 122 and/or application 136 to display the user interface 138 as a graphical user interface to the user.

In embodiments, the layouts are displayed in the layout recommendation pane based on the determined cost value. As an example, the layouts may be displayed in an ascending order, where the first layout has a lowest cost value compared to other layouts. Alternatively, the layouts may be displayed in a descending order, where the first layout has a highest cost value compared to other layouts. In this way, the canvas analysis engine 116 displays the layouts based on the cost value for each layout to a user.

In embodiments, the canvas learning model 118 used as part of the layout generation service 114 may be trained by a training mechanism 124 such as mechanisms known in the art. The training mechanism 124 may use training datasets stored in the data store 112 or at other locations to provide initial and ongoing training for the canvas learning model 118. In one implementation, the training mechanism 124 may use the canvas data from the data store 112 to train canvas learning model 118 via deep neural networks. In embodiments, the initial training may be performed in an offline stage.

In one implementation, the sets of training data include canvas data detected from the client device 130. Specifically, the canvas data in the sets of training data include dimensions of the canvas, dimensions of each design feature within the canvas, and the relationships between each design feature and the canvas, amongst other information. In another implementation, the sets of training data include the layout data from the knowledge base within the data store 112. As an example, the layout data in the sets of training data include the weightings of each cost rule from previous layouts.

In embodiments, the data store 112 may also include testing sets for testing the canvas learning model 118 after it has been trained to ensure accuracy of the canvas learning model 118. The types of data used for the sets of training data to train the canvas learning model 118 may be different from the types of data used in the sets of testing data for testing the canvas learning model 118. In an example, layout data from previous layouts is used for training data and development of the canvas learning model 118, while canvas data detected from the client device 130 is utilized to evaluate accuracy of the canvas learning model 118.

In embodiments, the client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices for client device 130 include but are not limited to personal computers, desktop computers, laptop computers, mobile telephones; smart phones; tablets; phablets; smart watches; wearable computers; gaming devices/computers; televisions; and the like. The internal hardware structure of a client device, e.g., client device 130, is discussed in greater detail in regard to FIGS. 5 and 6.

The client device 130 may include one or more applications 136. Each application 136 may be a computer program executed on the client device 130 that configures the device to be responsive to user input to allow the layout generation service 114 to detect the canvas data from the client device, via the application 136. Examples of suitable design applications include, but are not limited to, a presentation application (e.g., Microsoft PowerPoint), a document editing application, a communications application or a standalone application designed specifically which allows a user to create a layout of content using design features for a particular topic in a particular medium.

In some examples, applications used to provide the canvas data may be executed on the server 110 (e.g., applications 122) and be provided via an online service. In one implementation, web applications may communicate via the network 140 with the user agent 132, such as a browser, executing on the client device 130. The user agent 132 may provide a user interface 138 that allows the user to interact with applications 122 and may enable applications 122 to provide the canvas data to the layout generation service 114 for processing. In other examples, applications used to receive canvas data and/or determine execution of commands may be local applications such as the applications 136 that are stored and executed on the client device 130 and provide the user interface 138 that allows the user to interact with the application, e.g., applications 122. The canvas data from applications 136 may also be provided via the network 140 to the layout generation service 114 for use in detecting design features within a canvas. In even further examples, the layout generation service 114 may be applied directly on a device, e.g., client device 130.

FIG. 2 depicts a simplified architecture 200 for use by the canvas analysis engine 116 to generate layouts in response to execution of commands. Architecture 200 may include canvas data 210 which is obtained from an initial layout a user is generating utilizing the client device 130. In embodiments, the canvas data 210 includes an image of the canvas within the initial layout the user is generating.

In response to the layout generation service 114 receiving the canvas data 210, the canvas analysis engine 116 implements a feature detection engine 220. Specifically, the feature detection engine 220 uses machine learning models, e.g., the canvas learning model 118, to analyze the image of the canvas for detecting the design features within the canvas of the initial layout. Specifically, to detect the design features and/or determine parameters of the design features and/or canvas, the canvas analysis engine 116 through the feature detection engine 220 implements computer vision and/or natural language processing techniques, amongst other techniques.

In embodiments, the canvas analysis engine 116 through the feature detection engine 220 also implements edge detection techniques to determine parameters of the design features. Specifically, the edge detection techniques allow for the extraction of bounding boxes around the design features. In response to extracting the bounding boxes, the feature detection engine 220 uses the bounding boxes to determine parameters of the design features. Examples of parameters determined by the feature detection engine 220 include a height of the design feature, a width of the design feature, and coordinates of the design feature, amongst other parameters.

In embodiments, in response to the layout generation service 114 detecting the design features and determining parameters of the design features and/or the canvas, the canvas analysis engine 116 implements a command execution determination engine 230. Specifically, the canvas analysis engine 116 through the command execution determination engine 230 takes a current image of the canvas. In embodiments, the canvas analysis engine 116 may take the current image after a specific period of time lapses. For, the canvas analysis engine 116 takes the current image of the canvas after a period of one minute lapses from accessing the initial layout.

In embodiments, in response to taking the current image of the canvas, the canvas analysis engine 116 through the command execution determination engine 230 detects design features within the current image. In embodiments, in response to detecting design features in the current image, the canvas analysis engine 116 compares the detected design features from the current image to the detected design features in the image from the canvas data 210.

In embodiments, in response to detecting the design features in the current image of the canvas, the canvas analysis engine 116 through the command execution determination engine 230 compares the detected design features from the current image to the detected design features in the image of the canvas data 210. In response to detecting an additional design feature within the canvas that was not present previously in the image of the canvas data 210, the command execution determination engine 230 determines the user executed an addition command. Additionally and/or alternatively, in response to detecting a design feature missing from the current image of the canvas, the command execution determination engine 230 determines the user executed a deletion command.

In response to determining the execution of the command, the canvas analysis engine 116 implements a layout generation engine 240 to generate various layouts of content. In embodiments, each layout generated by the layout generation engine 240 includes modifications to the design features detected from current image. As an example, the canvas analysis engine 116 through the layout generation engine 240 may generate a layout which includes a modification to a design feature of a changed orientation of that design feature in comparison to a previous orientation of that design feature in the current image. As another example, the canvas analysis engine 116 through the layout generation engine 240 generates a layout which includes a modification to a design feature of a changed size of that design feature in comparison to a previous size of that design feature in the current image. As a further example, the canvas analysis engine 116 through the layout generation engine 240 may generate a layout having modifications to design features of changed positions of the design features compared to previous positions of the design features.

In response to grouping the detected changes into groups, the canvas analysis engine 116 implements a cost engine 250. In embodiments, the canvas analysis engine 116 through the cost engine 250 determines a cost value for each layout generated by the layout generation engine 240. Specifically, the cost engine 250 determines parameters of the modified design features within each generated layout. Similar to the feature detection engine 220 determining the parameters of the design features from the canvas data, the cost engine 240 determines parameters of the modified design features using machine learning models. Specifically, the canvas analysis engine 116 through the cost engine 250 uses edge detection techniques to extract bounding boxes around the modified design features. In response to extracting the bounding boxes, the cost engine 250 determines the parameters of the modified design features using the bounding boxes.

In response to determining the parameters of the modified design features, the cost engine 250 determines a cost value for each layout based on the parameters of the modified design features. Specifically, the canvas analysis engine 116 determines a cost value for each layout by applying at least one cost rule out of a plurality of cost rules to the parameters of the design features which are not modified and/or the parameters of the modified design features within that specific layout. In embodiments, the rules include an overflow cost rule, an overlap cost rule, a resize cost rule, an alignment cost rule, a symmetry cost rule, an image aspect ratio cost rule, an unoccupied space cost rule, and a constraint violation cost rule. As an example, the overflow cost rule includes an addition of a penalty to that particular layout if a bounding box of a modified design feature overflows the canvas. In embodiments, the penalty for violating the overflow cost rule increases in value as an area of the modified design feature which overflows the canvas increases. If there is no overflow, the overflow cost rule is not violated and the cost value is 0.

In response to determining the cost value for each layout, the canvas analysis engine 116 displays the layouts in a layout recommendation pane based on the determined cost value of each layout. In embodiments, the canvas analysis engine 116 display the layout recommendations on the user interface 138 of the client device 130.

Figure 3A:
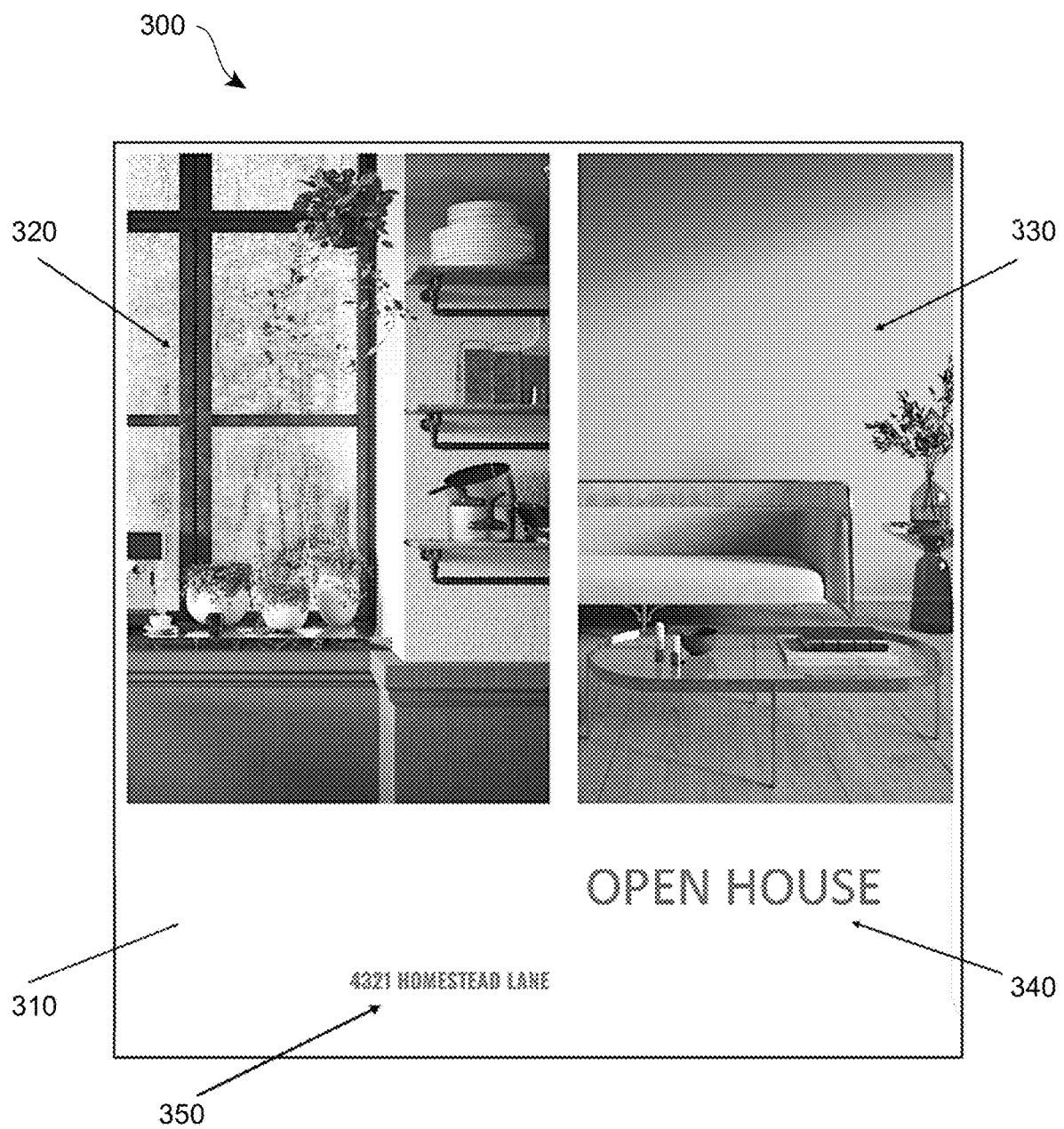
FIGS. 3A-3H depict layouts of content in accordance with aspects of the disclosure.

FIGS. 3A-3H depict layouts of content in accordance with aspects of the present application. With reference to FIGS. 1 and 2, FIG. 3A illustrates an initial layout 300 generated by a user utilizing the client device 130. In embodiments, the layout generation service 114 accesses the initial layout 300 through a design application running on the client device 130. As shown in FIG. 3A, initial layout 300 is with respect to a real estate topic. In response to accessing the initial layout 300, the layout generation service 114 takes an image of the canvas 310. In this way, the layout generation service 114 receives canvas data from the initial layout 300, with the canvas data including an image of the canvas 310.

Continuing with FIG. 3A, the initial layout 300 includes a canvas 310, with the canvas 310 including a plurality of design features 320, 330, 340, 350. As shown in FIG. 3A, the design features 320, 330, 340, 350 are related to a real estate topic. Specifically, design features 320, 330 are images illustrating real estate, while design features 340, 350 are text boxes providing identifying information for the real estate illustrated in design features 320, 330. To detect the design features 320, 330, 340, 350, the layout generation service 114 applies computer vision and natural language processing techniques, amongst other possible techniques, to the image of the canvas.

Figure 3B:
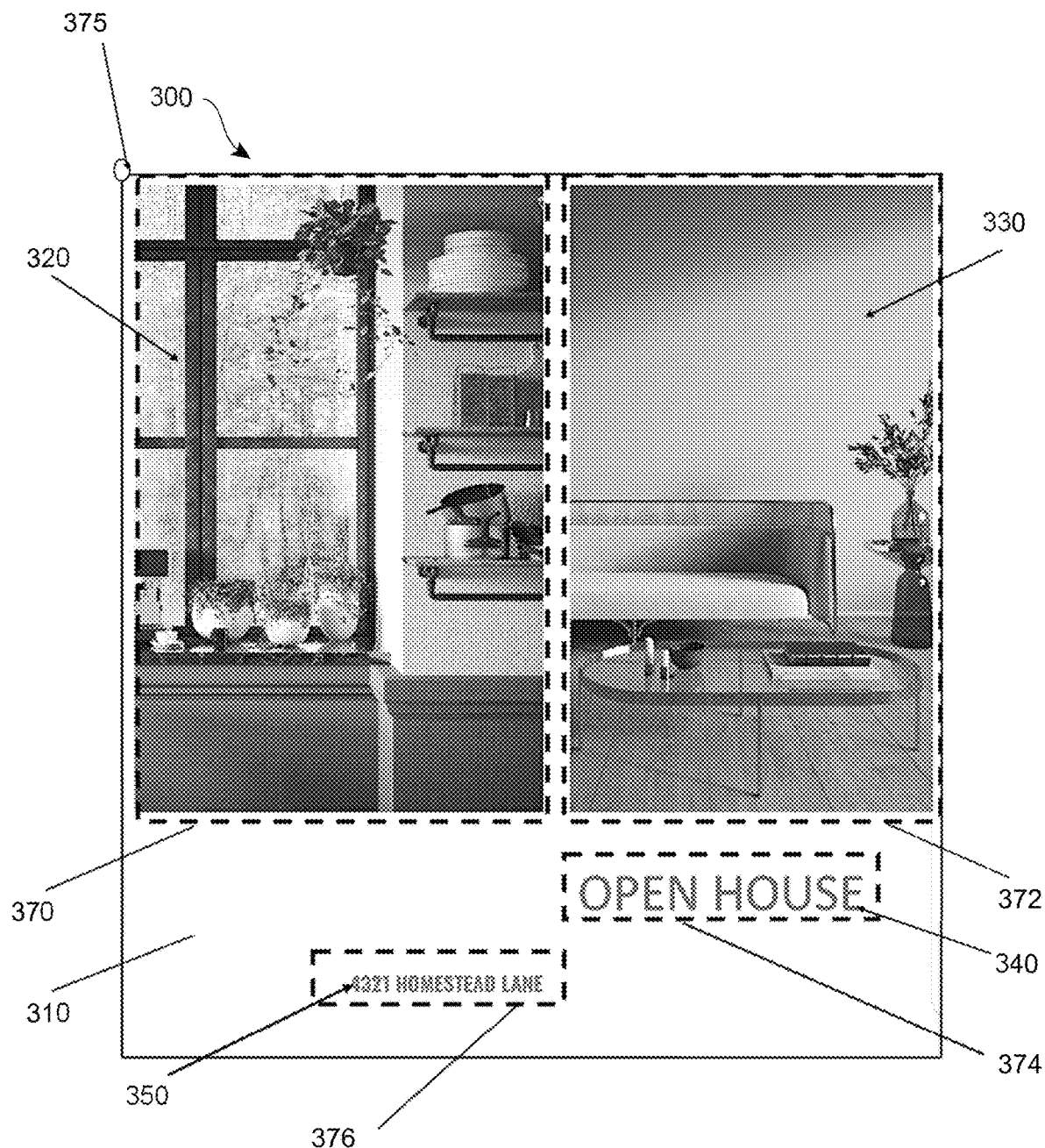

Referring to FIG. 3B, the layout generation service 114 determines parameters of the canvas 310. In embodiments, the layout generation service 114 applies edge detection techniques to determine dimensions of the canvas 310 as parameters of the canvas. Examples of the dimensions detected by the layout generation service 114 include a height and/or a width of the canvas 310. In embodiments, the layout generation service 114 also determines an origin 375 within the canvas 310 using the edge detection techniques. The origin 375 serves as a reference point within the canvas 310 for coordinates of a design feature. As shown in FIG. 3B, the layout generation service 114 determines the origin 375 as a corner of the canvas 310.

Continuing with FIG. 3B, the layout generation service 114 determines parameters of the design features 320, 330, 340, 350. In embodiments, the layout generation service 114 applies edge detection techniques to determine the parameters of the design features 320, 330, 340, 350. Specifically, the layout generation service 114 applies the edge detection techniques to extract bounding boxes 370, 372, 374, 376 around the design features 320, 330, 340, 350. In embodiments, the layout generation service 114 measures a length of a side of a bounding box of the bounding boxes 370, 372, 374, 376 to determine a height or a width of a design feature of the design features 320, 330, 340, 350.

The layout generation service 114 further utilizes the bounding boxes 370, 372, 374, 376 to determine coordinates of each design feature of the design features 320, 330, 340, 350 as additional parameters using the origin 375 of the canvas 310. As an example, a corner of the bounding box 372 is 5 mm away from the origin 375 of the canvas 310 in an x-direction, and 10 mm away from the origin 375 of the canvas 310 in the y-direction. In this example, the design feature 330 has x, y coordinates of [5,10] for this point of the bounding box 372.

Figure 3C:
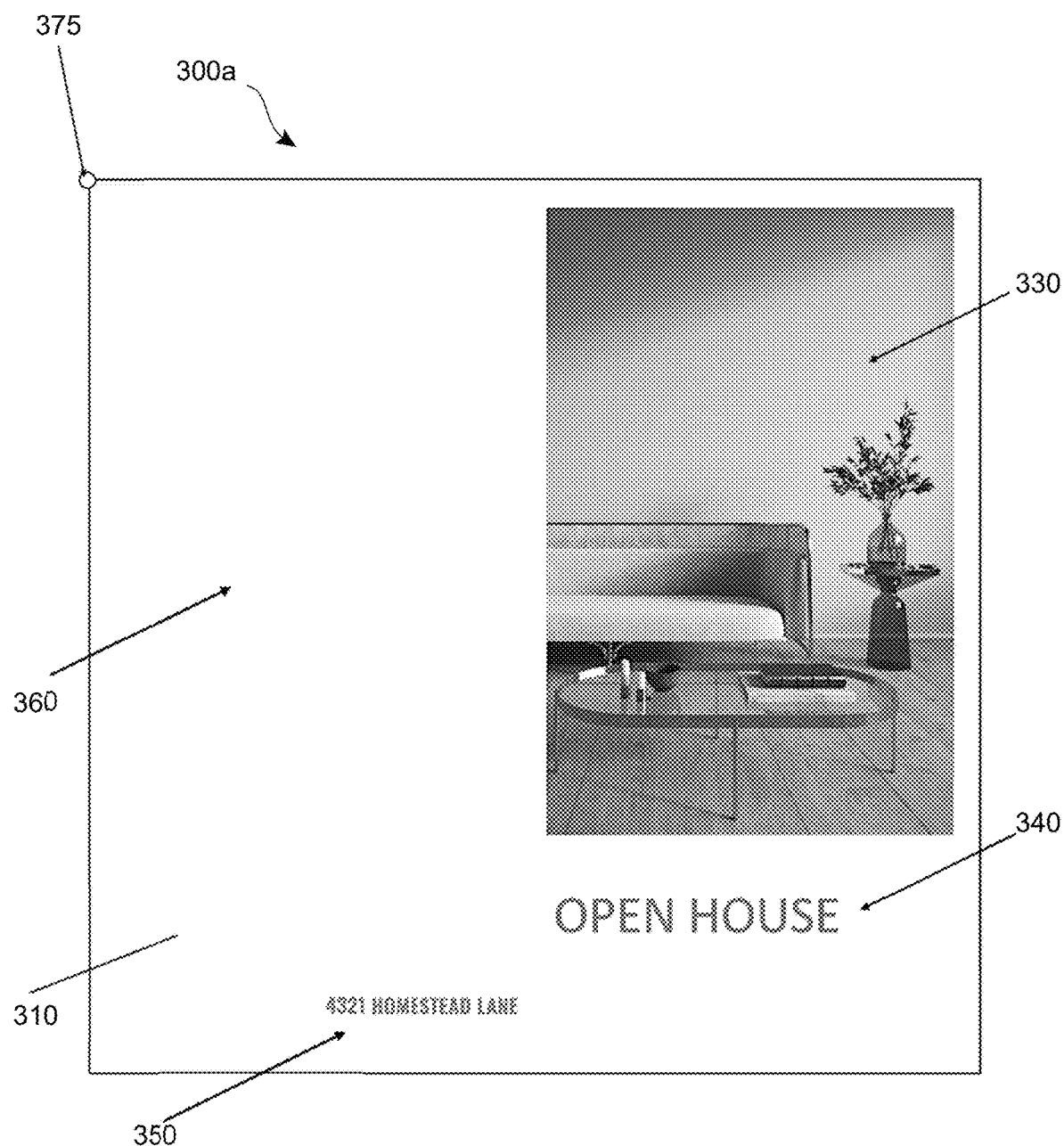

Referring to FIG. 3C, the layout generation service 114 determines an execution of a command by comparing the image from the canvas data to a current image of the canvas 310 in a current layout 300a. Specifically, the layout generation service 114 takes the current image of the canvas 310 of the current layout 300a after a specific period of time lapses. As an example, the layout generation service 114 takes the current image of the canvas 310 after a period of one minute lapses from accessing the initial layout 300.

In response to taking the current image, the layout generation service 114 detects the design features 330, 340, 350 within the current image. Specifically, the layout generation service 114 utilizes computer vision to detect the design features 330, 340, 350 within the current image. In response to detecting design features 330, 340, 350 in the current image, the layout generation service 114 compares the detected design features 330, 340, 350 from the current image to the detected design features 320, 330, 340, 350 in the image from the canvas data. In this way, the canvas analysis engine 116 determines an execution of a command by comparing the image from the canvas data to a current image of the canvas 310. As shown in FIG. 3B, the design feature 320 is missing from the current image of the canvas 310. In this example, the layout generation service 114 determines the user executed a deletion command since the design feature 320 is missing from the canvas 310. Further, the layout generation service 114 detects unoccupied space 360 by using edge detection techniques to determine there is not a design feature present in the unoccupied space 360.

Figure 3D:
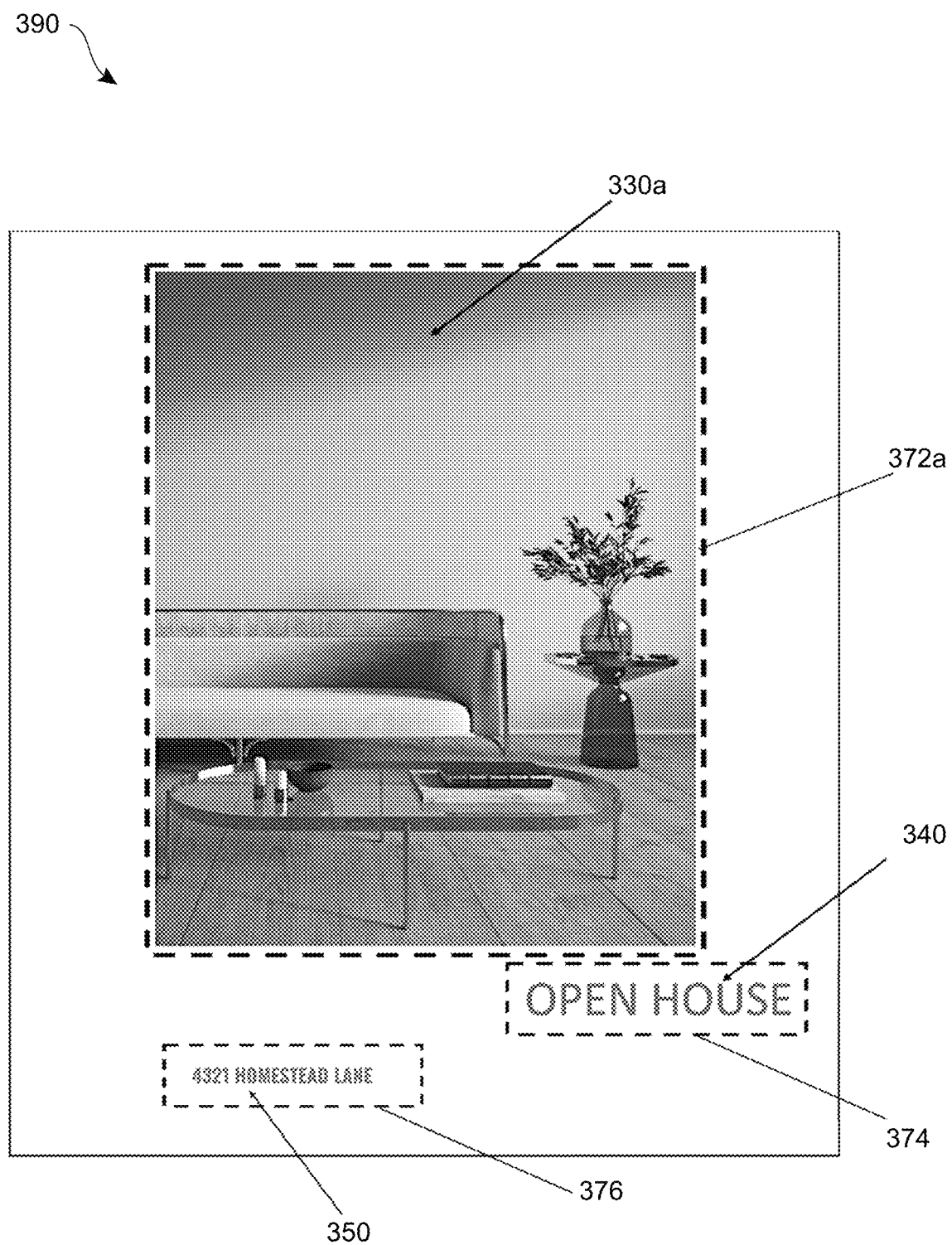
Figure 3E:
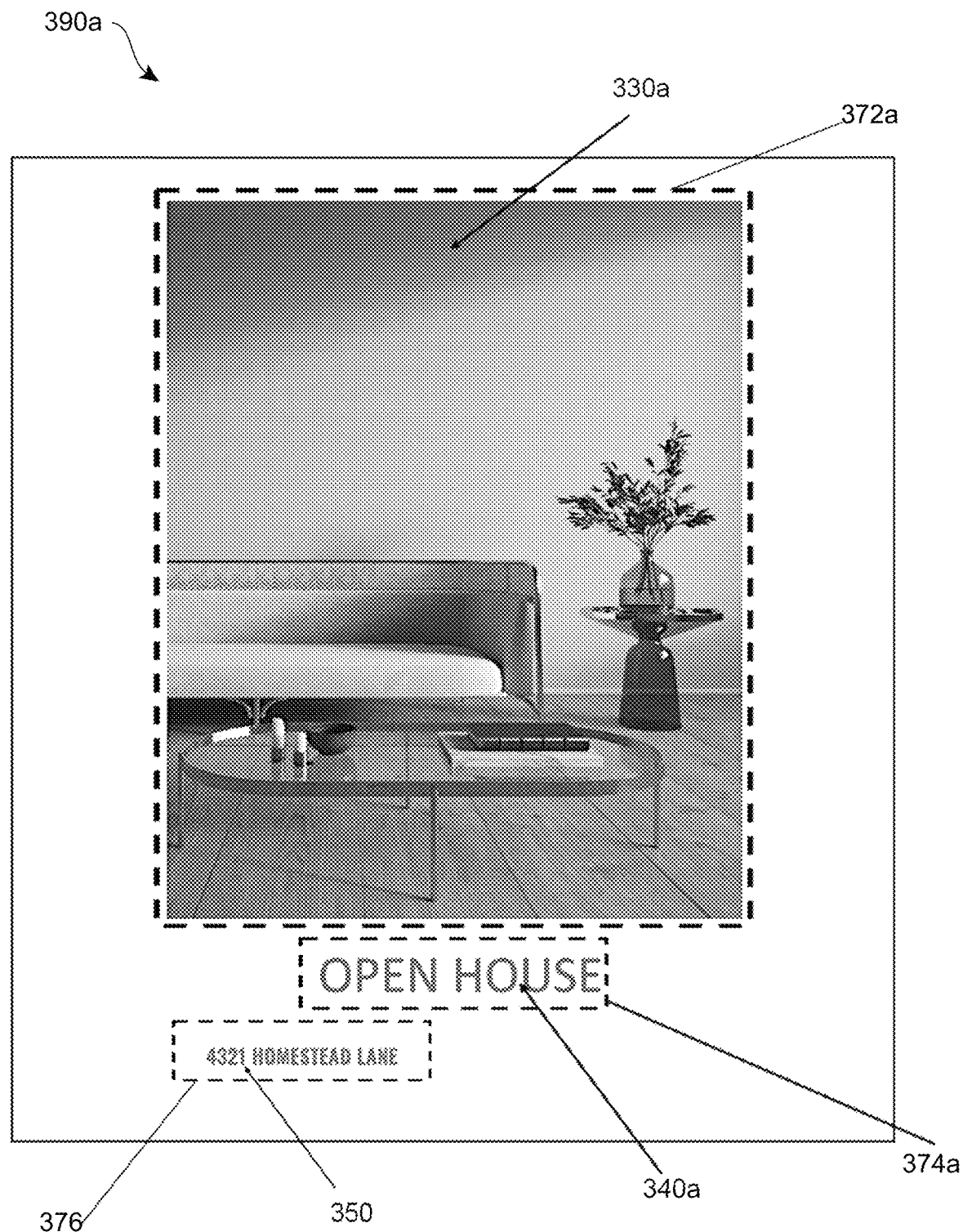
Figure 3F:
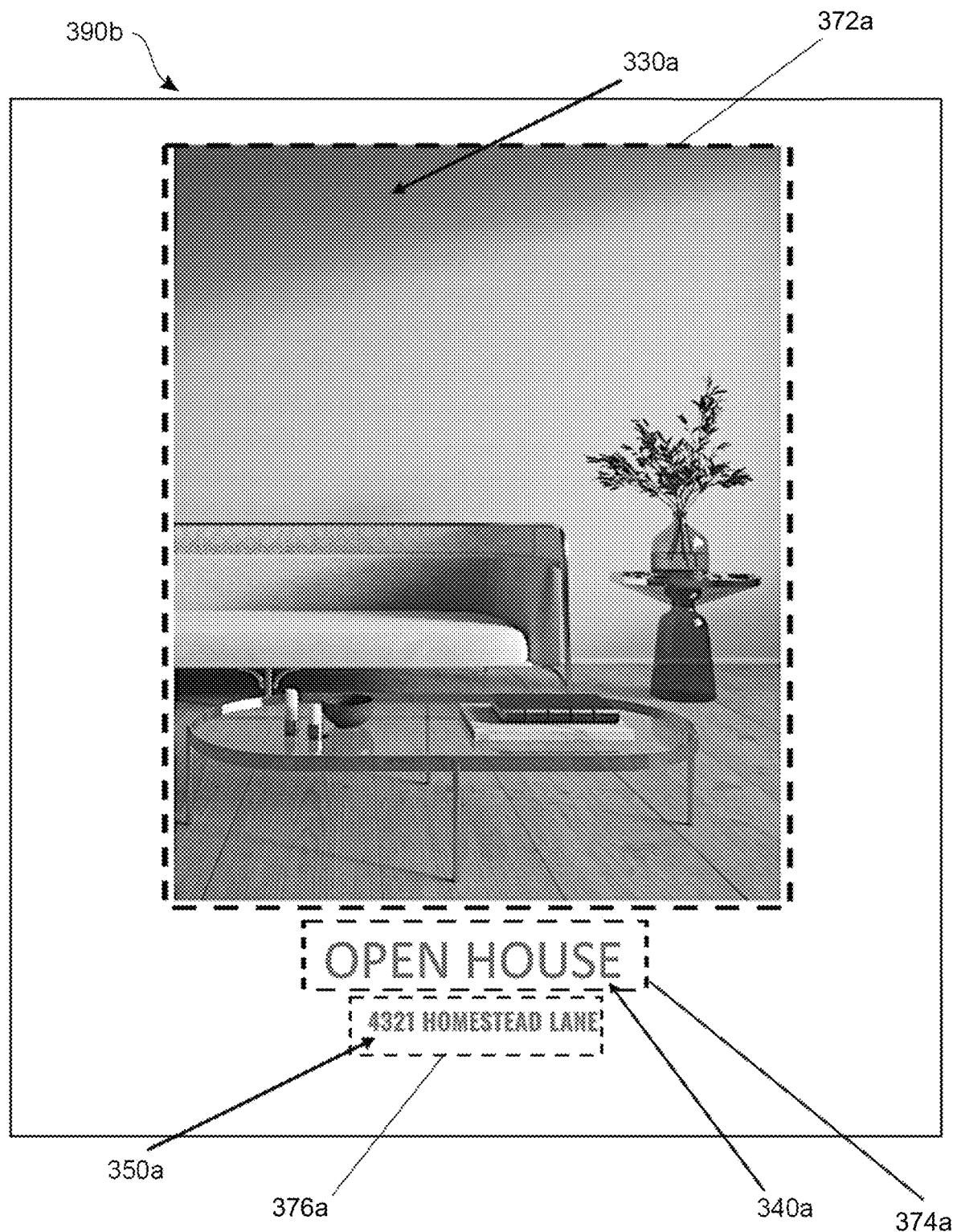

Referring to FIGS. 3D-3F, the layout generation service 114 modifies the design features 330, 340, 350 into modified design features 330a, 340a, 350a to generate layouts 390, 390a, 390b, in response to determining the execution of the command. Specifically, the layout generation service 114 generates the various layouts 390, 390a, 390b so that every modification available for each design feature of the design features 330, 340, 350 is shown in at least one layout of the layouts 390, 390a, 390b. To modify a design feature, the layout generation service 114 changes an orientation of a design feature, a position of a design feature, increase a size of a design feature, and/or decrease a size of a design feature, amongst other examples of modifications.

As shown in FIG. 3D, the layout generation service 114 modifies the design feature 330 to generate the modified design feature 330a by changing a size of the design feature 330 and a position of the design feature 330 within the canvas 310. As another example, as shown in as shown in FIG. 3E, the layout generation service 114 modifies the design feature 340 to generate the modified design feature 340a by changing a position of the design feature 340 within the canvas 310, while FIG. 3F illustrates the design feature 350 modified as the modified design feature 350a by changing a position of the design feature 350.

In response to modifying the design features 330, 340, 350 and generating the layouts 390, 390a, 390b, the layout generation service 114 determines a cost value for each layout of the layouts 390, 390a, 390b. Specifically, to determine the cost value for each layout, the layout generation service 114 applies rules to parameters of the design features 330, 340, 350 and/or modified design features 330a, 340a, 350a.

To determine the parameters of the modified design features 330a, 340a, 350a, the layout generation service 114 uses edge detection techniques to extract bounding boxes 372a, 374a, 376a around the modified design features 330a, 340a, 350a. Similar to determining the parameters of the design features 320, 330, 340, 350, the layout generation service 114 uses the origin 375 of the canvas and/or measures sides of the bounding boxes 372a, 374a, 376a, amongst other techniques, to determine the parameters of the modified design features 330a, 340a, 350a.

In response to determining the parameters of the modified design features 330a, 340a, 350a, the layout generation service 114 determines a cost value for each layout of the layouts 390, 390a, 390b by applying at least one rule out of a plurality of rules to the parameters of the design features 330, 340, 350 and/or by applying rules to the parameters of the modified design features 330a, 340a, 350a.

The rules include an overflow cost rule, an overlap cost rule, a resize cost rule, an alignment cost rule, a symmetry cost rule, an image aspect ratio cost rule, an unoccupied space cost rule, and a constraint violation cost rule. For example, the layout generation service 114 may apply an alignment cost rule. Specifically, the alignment cost rule includes a penalty to a particular layout if the design features 330a, 340a, 350a are not aligned with respect to one another. As a further example, a cost value of layout 390a is greater than a cost value of the layout 390b, since the layout generation service 114 adds a penalty to layout 390a because design features 340a, 350 are not aligned with respect to one another, while layout 390b does have design features 340a, 350a aligned with respect to one another.

Figure 3G:
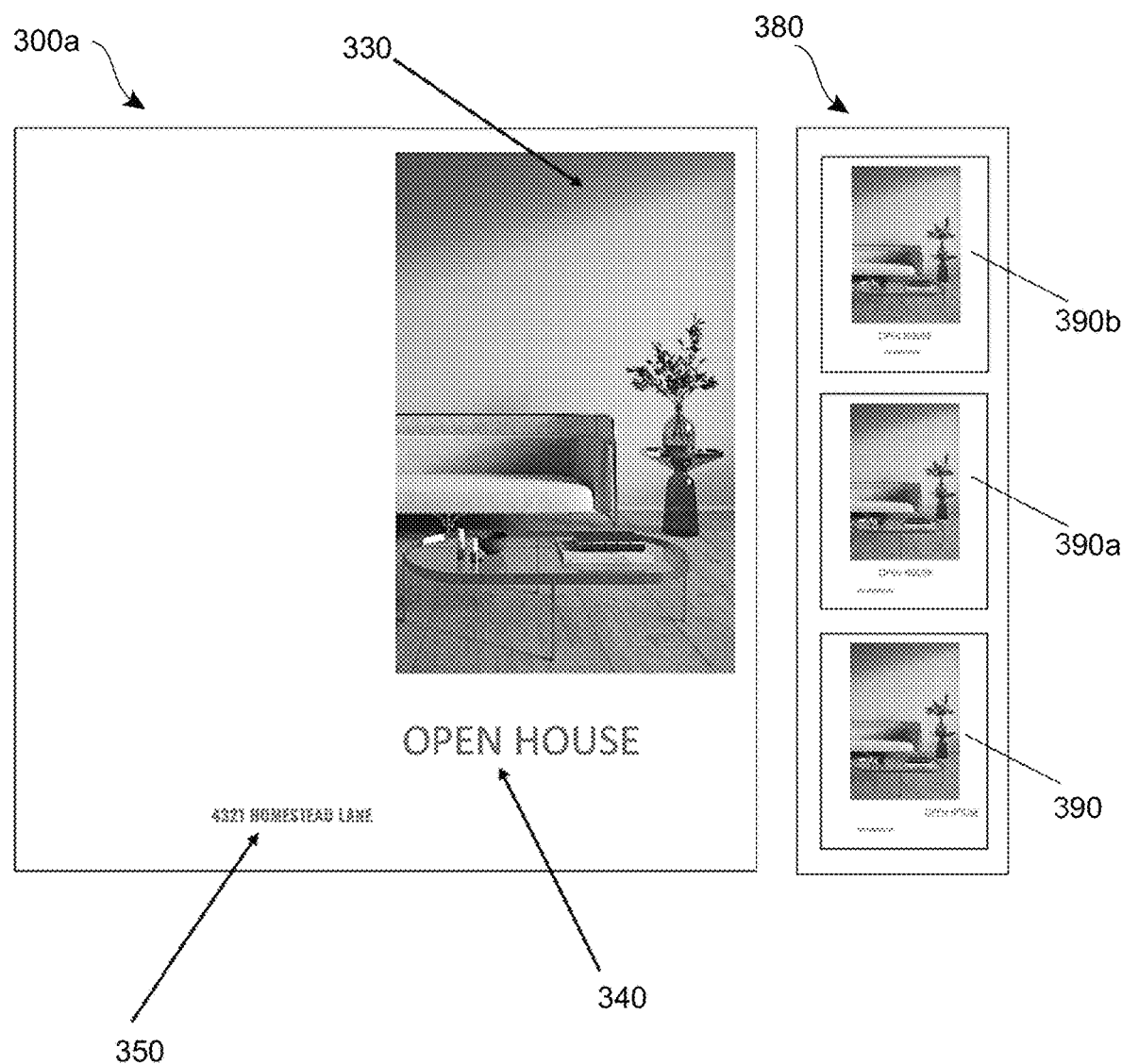
Figure 3H:
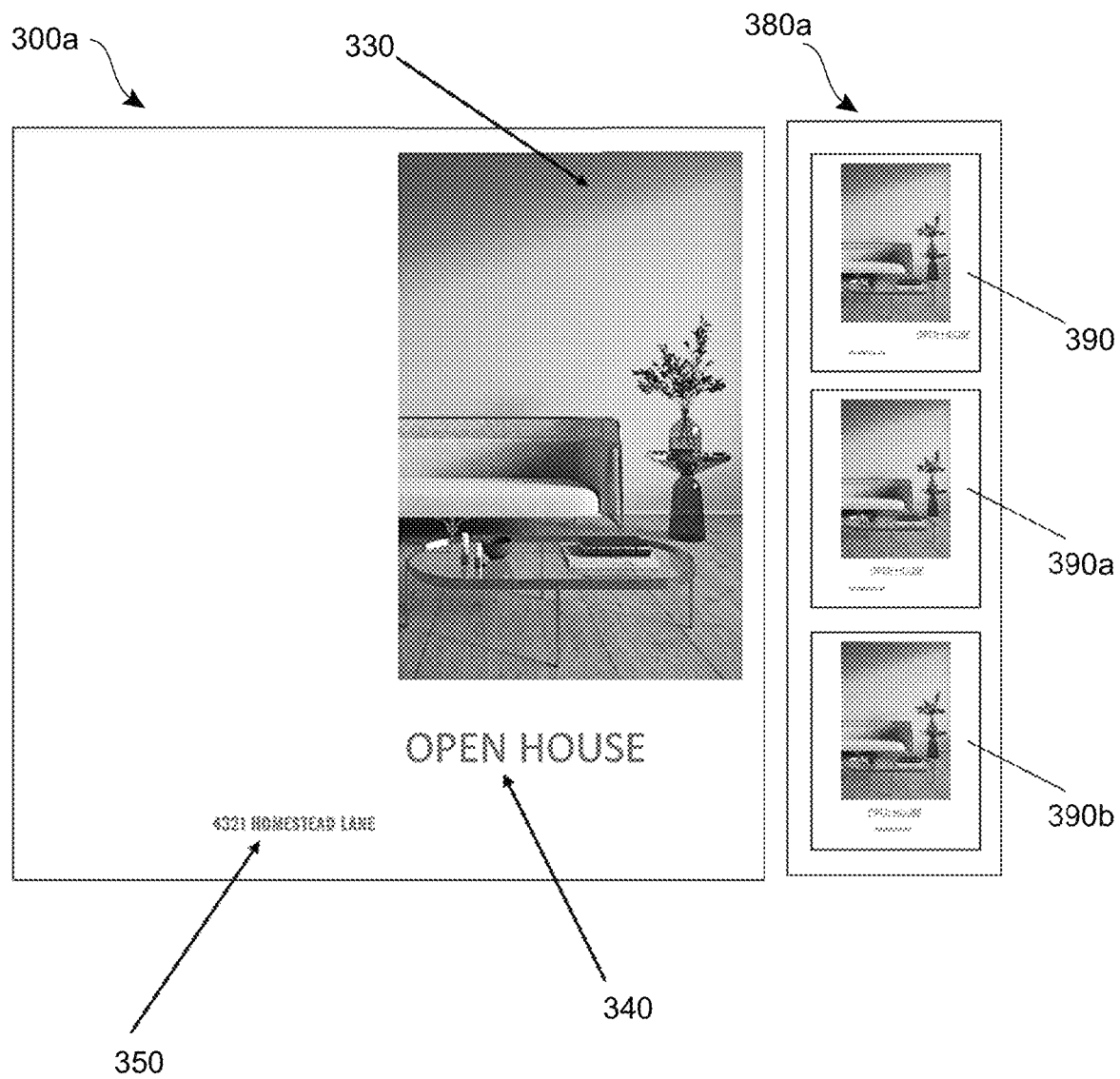

Referring to FIGS. 3G and 3H, in response to determining a cost value for each layout of the layouts 390, 390a, 390b, the layout generation service 114 generates and displays a layout recommendation pane 380 which displays the layouts 390, 390a, 390b based on their determined cost value. Specifically, the layout generation service 114 displays the layout recommendation pane 380 on the client device 130 through the user interface 138. As an example, the layout generation service 114 displays the layout recommendation pane 380 adjacent to the current layout 300a.

Referring to FIG. 3G, the layouts 390, 390a, 390b are displayed in the layout recommendation pane 380 in an ascending cost order, where the first layout 390b has a lowest cost compared to other layouts 390, 390a. Alternatively, as shown in FIG. 3H, the layouts 390, 390a, 390b may be displayed in a descending order, where the first layout 390 has a greater cost value compared to other layouts 390a, 390b. In this way, the layout generation service 114 displays the layouts 390, 390a, 390b to the user based on the determined cost value for each layout.

Figure 4:
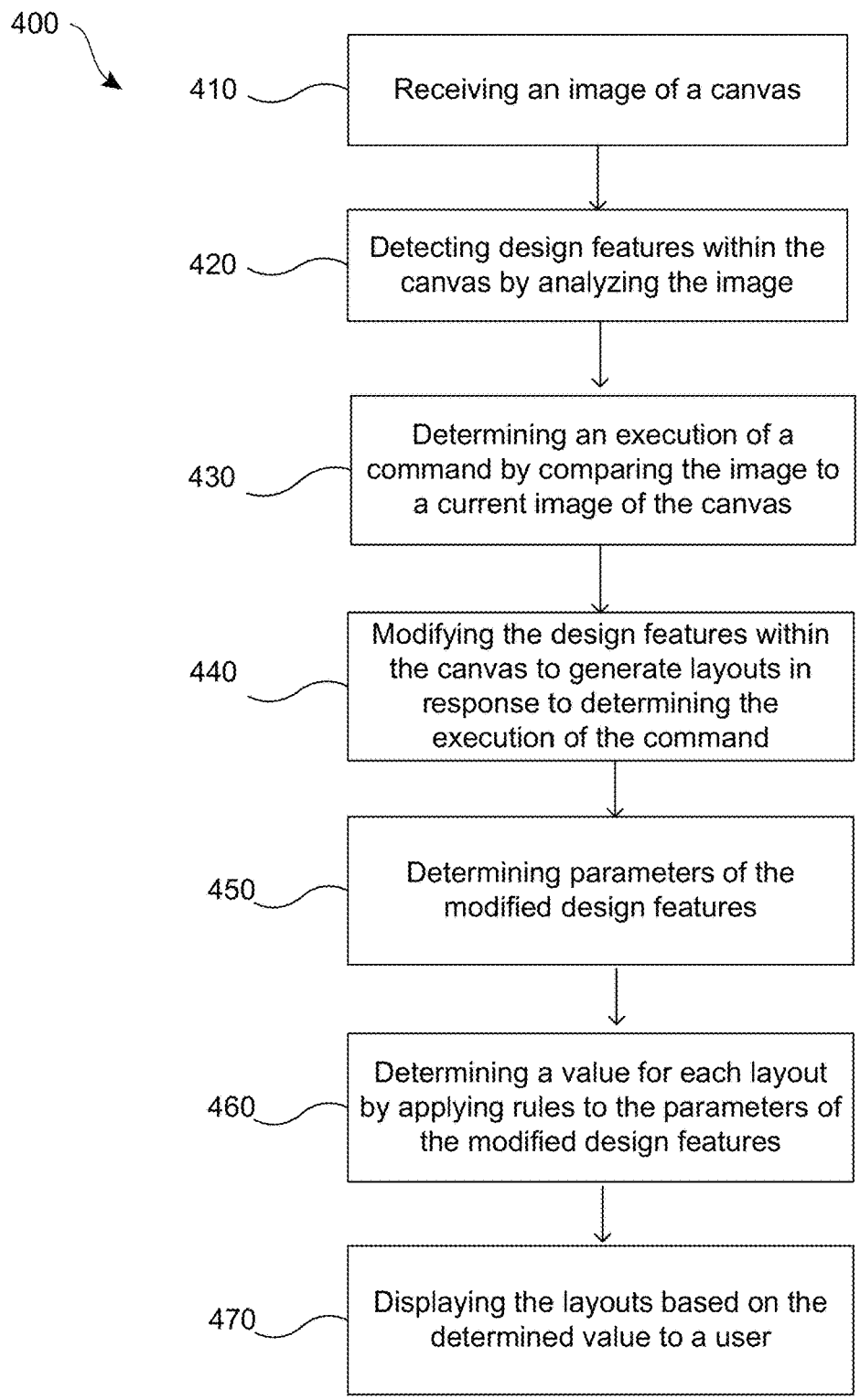
FIG. 4 is a flow diagram of a process for generating layouts of content.

FIG. 4 is a flow diagram of a process 400 for generating layouts to a user. With reference to FIGS. 1-3H, at step 410, the layout generation service 114 receives an image of a canvas. Specifically, the layout generation service 114 receives the image of the canvas 310 as canvas data by accessing a design application on the client device 130 that the user is utilizing to generate an initial layout 300.

At step 420, the layout generation service 114 detects design features within the canvas by analyzing the image. Specifically, the layout generation service 114 detects the design features 320, 330, 340, 350 by applying computer vision and natural language processing techniques, amongst other possible techniques, to the image of the canvas 310.

At step 430, the layout generation service 114 determines an execution of a command by comparing the image to a current image of the canvas. Specifically, the layout generation service 114 determines the execution of the command by comparing the detected features 320, 330, 340, 350 from the canvas 310 of the initial layout 300 to the detected features 330, 340, 350 from the canvas 310 of the current layout 300a.

At step 440, the layout generation service 114 modifies the design features within the canvas to generate layouts in response to determining the execution of the command. Specifically, the layout generation service 114 modifies the design features 330, 340, 350 within the canvas 310 into the modified design features 330a, 340a, 350a to generate the layouts 390, 390a, 390b. The layout generation service 114 modifies the design features 330, 340, 350 by changing an orientation of a design feature, a position of a design feature, increasing a size of a design feature, and/or decreasing a size of a design feature, amongst other examples of modifications.

At step 450, the layout generation service 114 determines parameters of the modified design features 330a, 340a, 350a. Specifically, the layout generation service 114 determines the parameters of the modified design features 330a, 340a, 350a by utilizing edge detection techniques to extract bounding boxes 372a, 374a, 376a around the modified design features 330a, 340a, 350a. The layout generation service 114 may then perform measurements on the bounding boxes 372a, 374a, 376a to determine the parameters of the modified design features 330a, 340a, 350a.

At step 460, the layout generation service 114 determines a cost value for each layout by applying rules to the parameters of the modified design features. Specifically, the layout generation service 114 determines the cost value for each layout of the layouts 390, 390a, 390b by applying rules to the parameters of the modified design features 330a, 340a, 350a. Examples of the rules include an overflow cost rule, an overlap cost rule, a resize cost rule, an alignment cost rule, a symmetry cost rule, an image aspect ratio cost rule, a white space cost rule, and a constraint violation cost rule.

At step 470, the layout generation service 114 displays the layouts based on the determined cost value for each layout to a user. Specifically, the layout generation service 114 displays the layouts 390, 390a, 390b based on the cost value for each layout to a user by displaying a layout recommendation pane 380. Specifically, the layout generation service 114 displays the layout recommendation pane 380 through the user interface 138 of the client device 130.

Figure 5:
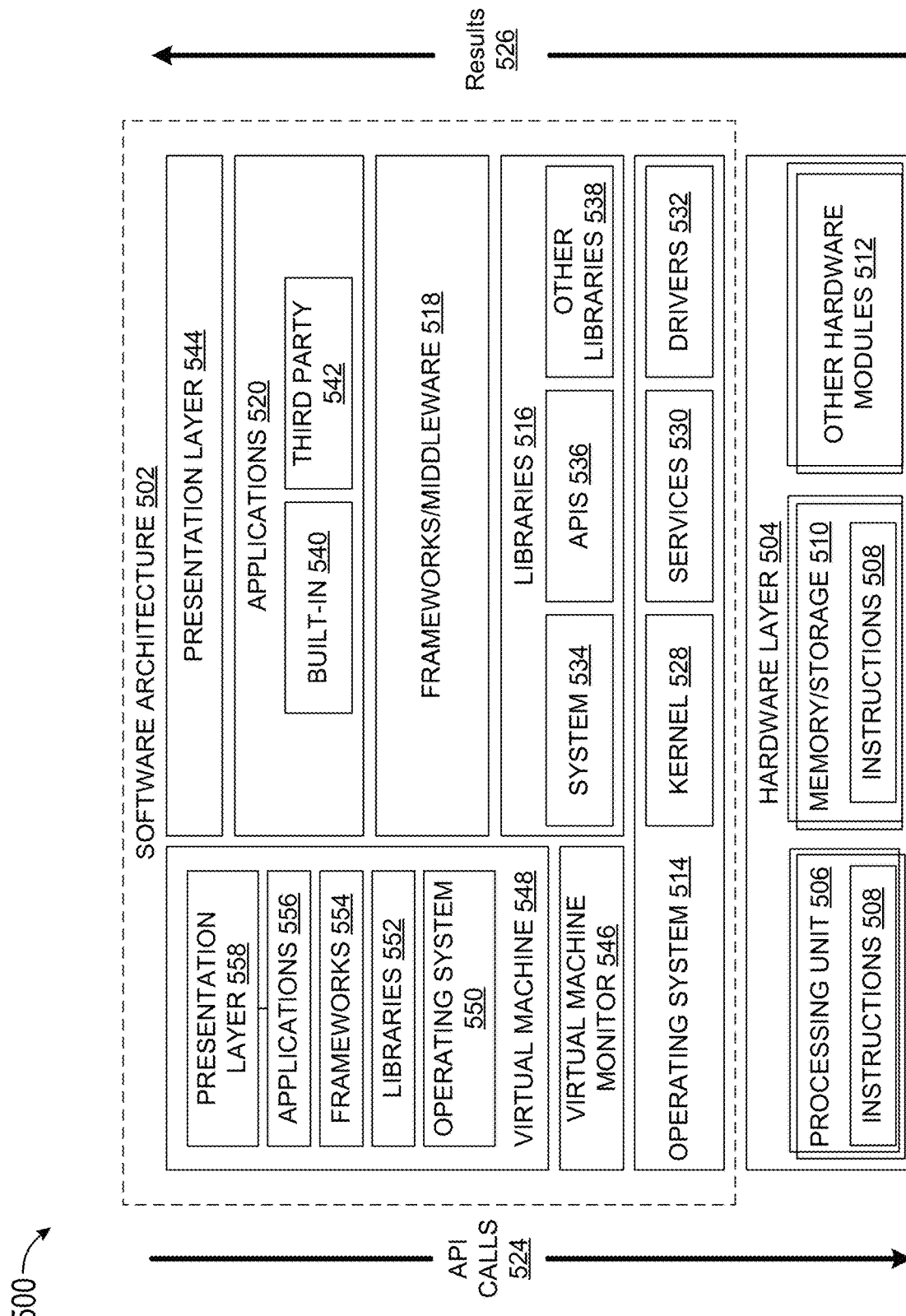
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 528. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
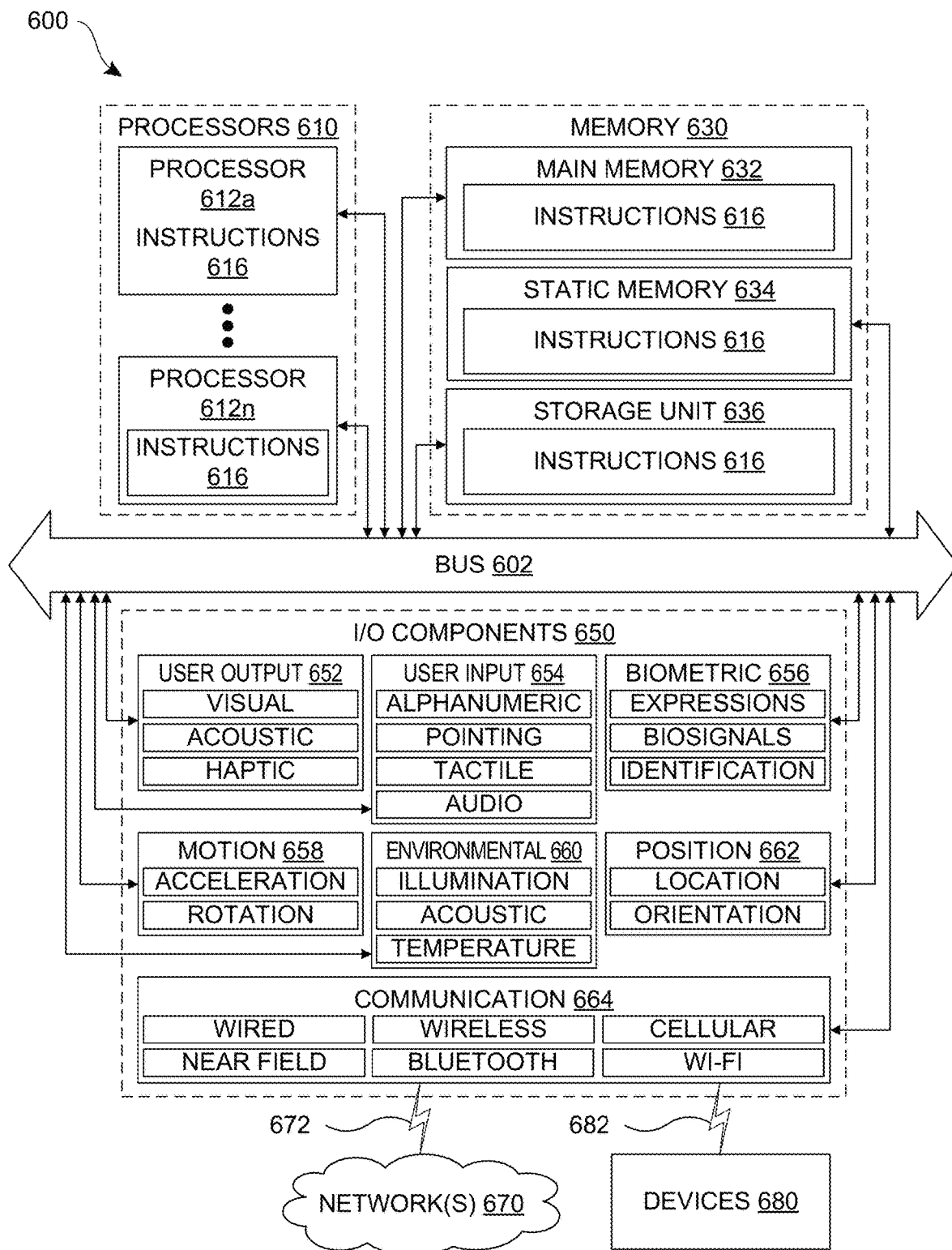
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

In further examples, the I/O components 650 may include motion components 658, which may include acceleration and/or rotation sensors. In embodiments, the I/O components 650 may include environmental components 660, which may include illumination, acoustic, and/or temperature sensors. Additionally, the I/O components 650 may include position components 660, which may include location and/or orientation sensors.

The I/O components 650 may also include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

Devices and methods for generating layouts are described. Devices can include a data processing system which includes processor, and a memory in communication with the processor, the memory comprising executable instructions that, when executed by the processor, cause the data processing system to perform various functions. The functions may include detecting design features within a canvas, modifying the design features to generate layouts, and displaying the layouts based on determined cost value.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the instant application will be described by means of items:

Item 1. A data processing system comprising:
a processor; and
a machine-readable storage medium storing executable instructions that, when executed, cause the processor to perform operations of:
receiving an image of a canvas;
detecting design features within the canvas by analyzing the image;
determining an execution of a command by comparing the image to a current image of the canvas;
modifying the design features within the canvas to generate layouts in response to determining the execution of the command;
determining parameters of the modified design features;
determining a value for each layout by applying rules to the parameters of the modified design features; and
displaying the layouts based on the determined value for each layout to a user.

Item 2. The data processing system of item 1, wherein the design features include images, text boxes, and videos.

Item 3. The data processing system of any one of items 1-2, wherein the execution of the command includes the user adding a design feature to the canvas, deleting a design feature from the canvas, or changing a size of a design feature within the canvas.

Item 4. The data processing system of any one of items 1-3, wherein the machine-readable storage medium includes instructions configured to cause the processor to perform an operation of:
extracting bounding boxes around the modified design features; and
using the bounding boxes to determine the parameters of the modified design features.

Item 5. The data processing system of any one of items 1-4, wherein the machine-readable storage medium includes instructions configured to cause the processor to perform an operation of:
extracting bounding boxes around the modified design features;
determining an origin of the canvas; and
using the bounding boxes and the origin of the canvas to determine the parameters of the modified design features Item 6. The data processing system of any one of items 1-5, wherein the parameters of the modified design features include coordinates for each modified design feature, a height for each modified design feature, and a width of each design feature.

Item 7. The data processing system of any one of items 1-6, wherein the rules include an overflow cost rule, an overlap cost rule, a resize cost rule, an alignment cost rule, a symmetry cost rule, an image aspect ratio cost rule, an unoccupied space cost rule, and a constraint violation cost rule.

Item 8. The data processing system of any one of items 1-7, wherein the machine-readable storage medium includes instructions configured to cause the processor to perform an operation of:
determining an origin of the canvas, wherein the rules are with respect to the origin.

Item 9. A method implemented in a data processing system, the method comprising:
receiving an image of a canvas;
detecting design features within the canvas by analyzing the image;
determining an execution of a command by comparing the image to a current image of the canvas;

modifying the design features within the canvas to generate layouts in response to determining the execution of the command;
determining parameters of the modified design features;
determining a value for each layout by applying rules to the parameters of the modified design features; and
displaying the layouts based on the determined value for each layout to a user.

Item 10. The method of item 9, wherein the design features include images, text boxes, and videos.

Item 11. The method of any one of items 9-10, wherein the execution of the command includes the user adding a design feature to the canvas, deleting a design feature from the canvas, or changing a size of a design feature within the canvas.

Item 12. The method of any one of items 9-11, further comprising:
extracting bounding boxes around the modified design features; and
using the bounding boxes to determine the parameters of the modified design features.

Item 13. The method of any one of items 9-12, further comprising:
extracting bounding boxes around the modified design features;
determining an origin of the canvas; and
using the bounding boxes and the origin of the canvas to determine the parameters of the modified design features.

Item 14. The method of any one of items 9-13, wherein the parameters of the modified design features include coordinates for each modified design feature, a height for each modified design feature, and a width of each design feature.

Item 15. The method of any one of items 9-14, wherein the rules include an overflow cost rule, an overlap cost rule, a resize cost rule, an alignment cost rule, a symmetry cost rule, an image aspect ratio cost rule, an unoccupied space cost rule, and a constraint violation cost rule.

Item 16. The method of any one of items 9-15, further comprising:
determining an origin of the canvas, wherein the rules are with respect to the origin.

Item 17. A machine-readable medium on which are stored instructions that, when executed, cause a processor of a programmable device to perform operations of:
receiving an image of a canvas;
detecting design features within the canvas by analyzing the image;
determining an execution of a command by comparing the image to a current image of the canvas;
modifying the design features within the canvas to generate layouts in response to determining the execution of the command;
determining parameters of the modified design features;
determining a value for each layout by applying rules to the parameters of the modified design features; and
displaying the layouts based on the determined value for each layout to a user.

Item 18. The machine-readable medium of item 17, wherein the design features include images, text boxes, and videos.

Item 19. The machine-readable medium of any one of items 17-18, wherein the execution of the command includes the user adding a design feature to the canvas, deleting a design feature from the canvas, or changing a size of a design feature within the canvas.

Item 20. The machine-readable medium of any one of items 17-19, wherein the parameters of the modified design features include coordinates for each modified design feature, a height for each modified design feature, and a width of each design feature.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations of:
   receiving a first image of a canvas;
   detecting design features within the canvas by analyzing the first image;
   after receiving the first image of the canvas, receiving a second image of the canvas;
   comparing the second image of the canvas to the first image of the canvas to determine that a command has been performed on the design features in the canvas that results in a modification of at least one design feature in the canvas;
   in response to determining that the command has been performed on the at least one design feature in the canvas, generating a plurality of layouts using a plurality of design features in the canvas such that one or more of the plurality of design features within the canvas are modified differently for each of the layouts;
   determining parameters of the plurality of design features for each of the layouts, respectively;
   determining a value for each of the layouts by applying rules to the parameters of the plurality of design features of the layouts; and
   displaying the layouts based on the value determined for each of the layouts to a user.

2. The data processing system of claim 1, wherein the design features include images, text boxes, and videos.

3. The data processing system of claim 1, wherein execution of the command includes the user adding a design feature to the canvas, deleting a design feature from the canvas, or changing a size of a design feature within the canvas.

4. The data processing system of claim 1, wherein the machine-readable storage medium includes instructions configured to cause the processor to perform an operation of:
   extracting bounding boxes around the design features; and
   using the bounding boxes to determine the parameters of the design features.

5. The data processing system of claim 1, wherein the machine-readable storage medium includes instructions configured to cause the processor to perform an operation of:
   extracting bounding boxes around the design features;
   determining an origin of the canvas; and
   using the bounding boxes and the origin of the canvas to determine the parameters of the design features.

6. The data processing system of claim 1, wherein the parameters include coordinates for each design feature, a height for each modified design feature, and a width of each design feature.

7. The data processing system of claim 1, wherein the rules include an overflow cost rule, an overlap cost rule, a resize cost rule, an alignment cost rule, a symmetry cost rule, an image aspect ratio cost rule, an unoccupied space cost rule, and a constraint violation cost rule.

8. The data processing system of claim 1, wherein the machine-readable storage medium includes instructions configured to cause the processor to perform an operation of:
   determining an origin of the canvas, wherein the rules are with respect to the origin.

9. A method implemented in a data processing system, the method comprising:
   receiving a first image of a canvas;
   detecting design features within the canvas by analyzing the first image;
   after receiving the first image of the canvas, receiving a second image of the canvas;
   comparing the second image of the canvas to the first image of the canvas to determine that a command has been performed on the design features in the canvas that results in a modification of at least one design feature in the canvas;
   in response to determining that the command has been performed on the at least one design feature in the canvas, generating a plurality of layouts using a plurality of design features in the canvas such that one or more of the plurality of design features within the canvas are modified differently for each of the layouts;
   determining parameters of the plurality of design features for each of the layouts, respectively;
   determining a value for each of the layouts by applying rules to the parameters of the plurality of design features of the layouts; and
   displaying the layouts based on the value determined for each of the layouts to a user.

10. The method of claim 9, wherein the design features include images, text boxes, and videos.

11. The method of claim 9, wherein execution of the command includes the user adding a design feature to the canvas, deleting a design feature from the canvas, or changing a size of a design feature within the canvas.

12. The method of claim 9, further comprising:
    extracting bounding boxes around the design features; and
    using the bounding boxes to determine the parameters of the design features.

13. The method of claim 9, further comprising:
    extracting bounding boxes around the design features;
    determining an origin of the canvas; and
    using the bounding boxes and the origin of the canvas to determine the parameters of the design features.

14. The method of claim 9, wherein the parameters include coordinates for each design feature, a height for each design feature, and a width of each design feature.

15. The method of claim 9, wherein the rules include an overflow cost rule, an overlap cost rule, a resize cost rule, an alignment cost rule, a symmetry cost rule, an image aspect ratio cost rule, an unoccupied space cost rule, and a constraint violation cost rule.

16. The method of claim 9, further comprising:
    determining an origin of the canvas, wherein the rules are with respect to the origin.

17. A machine-readable medium on which are stored instructions that, when executed, cause a processor of a programmable device to perform operations of:
    receiving a first image of a canvas;
    detecting design features within the canvas by analyzing the first image;
    after receiving the first image of the canvas, receiving a second image of the canvas;
    comparing the second image of the canvas to the first image of the canvas to determine that a command has been performed on the design features in the canvas that results in a modification of at least one design feature in the canvas;

in response to determining that the command has been performed on the at least one design feature in the canvas, generating a plurality of layouts using a plurality of design features in the canvas such that one or more of the plurality of design features within the canvas are modified differently for each of the layouts;

determining parameters of the plurality of design features for each of the layouts, respectively;

determining a value for each of the layouts by applying rules to the parameters of the plurality of design features of the layouts; and displaying the layouts based on the value determined for each of the layouts to a user.

18. The machine-readable medium of claim 17, wherein the design features include images, text boxes, and videos.

19. The machine-readable medium of claim 17, wherein execution of the command includes the user adding a design feature to the canvas, deleting a design feature from the canvas, or changing a size of a design feature within the canvas.

20. The machine-readable medium of claim 17, wherein the parameters of the design features include coordinates for each design feature, a height for each design feature, and a width of each design feature.

* * * * *